(12) United States Patent
Nakash

(10) Patent No.: US 8,902,729 B2
(45) Date of Patent: Dec. 2, 2014

(54) METHOD FOR FAST-RE-ROUTING (FRR) IN COMMUNICATION NETWORKS

(71) Applicant: ECI Telecom Ltd., Petach Tikva (IL)

(72) Inventor: Shell Nakash, Kfar Saba (IL)

(73) Assignee: ECI Telecom Ltd., Petach Tikva (IL)

( * ) Notice: Subject to any disclaimer, the term of this patent is extended or adjusted under 35 U.S.C. 154(b) by 131 days.

(21) Appl. No.: 13/649,210

(22) Filed: Oct. 11, 2012

(65) Prior Publication Data

US 2013/0094355 A1    Apr. 18, 2013

(30) Foreign Application Priority Data

Oct. 11, 2011   (IL) .......................................... 215738

(51) Int. Cl.
*H04L 12/26* (2006.01)
*H04L 12/723* (2013.01)
*H04L 12/703* (2013.01)
*H04L 12/437* (2006.01)

(52) U.S. Cl.
CPC ............... *H04L 45/28* (2013.01); *H04L 12/437* (2013.01); *H04L 45/502* (2013.01)

USPC .......................................................... 370/217

(58) Field of Classification Search
USPC .................................................. 370/216–253
See application file for complete search history.

(56) References Cited

U.S. PATENT DOCUMENTS

| | | | |
|---|---|---|---|
| 7,388,828 B2 * | 6/2008 | Nakash ......................... | 370/218 |
| 7,545,735 B1 * | 6/2009 | Shabtay et al. ............... | 370/217 |
| 8,144,601 B2 * | 3/2012 | Liu .............................. | 370/241.1 |
| 2007/0174483 A1 * | 7/2007 | Raj et al. ....................... | 709/238 |
| 2011/0007629 A1 * | 1/2011 | Atlas et al. .................... | 370/225 |
| 2012/0218884 A1 * | 8/2012 | Kini et al. ...................... | 370/228 |

* cited by examiner

*Primary Examiner* — Kwang B Yao
*Assistant Examiner* — Juvena Loo
(74) *Attorney, Agent, or Firm* — Browdy and Neimark, PLLC

(57) ABSTRACT

A method is described to enable carrying out a fast reroute protection technique which provides both link and node protection without traffic duplication, without the need to distinguish between link and node failures, and without replicating traffic. The technique covers concurrent Working and backup logical path failures, and in particular LSP logical paths. The method is adapted to provide a "Dual Failure Protection" (DFP), and is expandable to various multi-failure scenarios.

9 Claims, 4 Drawing Sheets

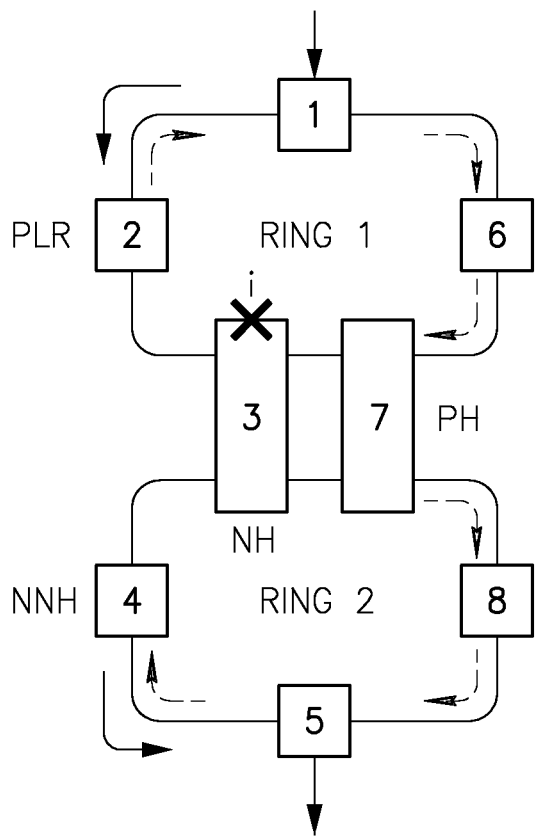 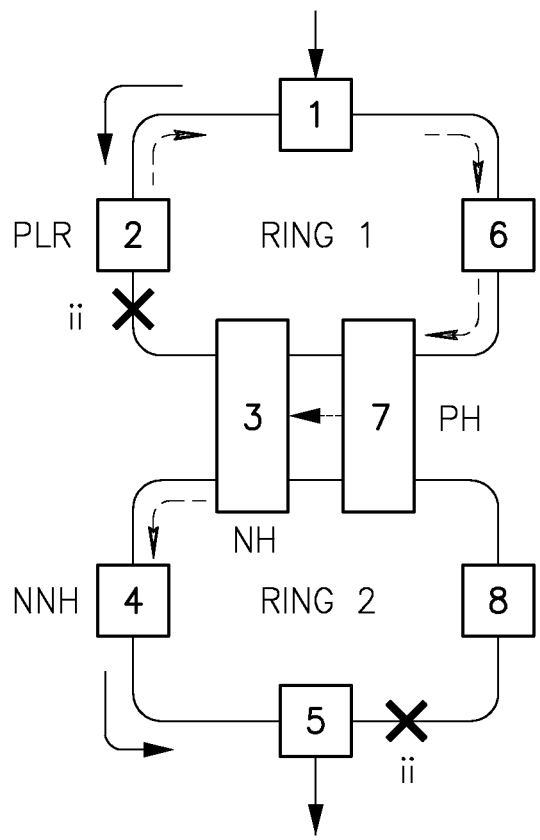
FIG.6A  FIG.6B
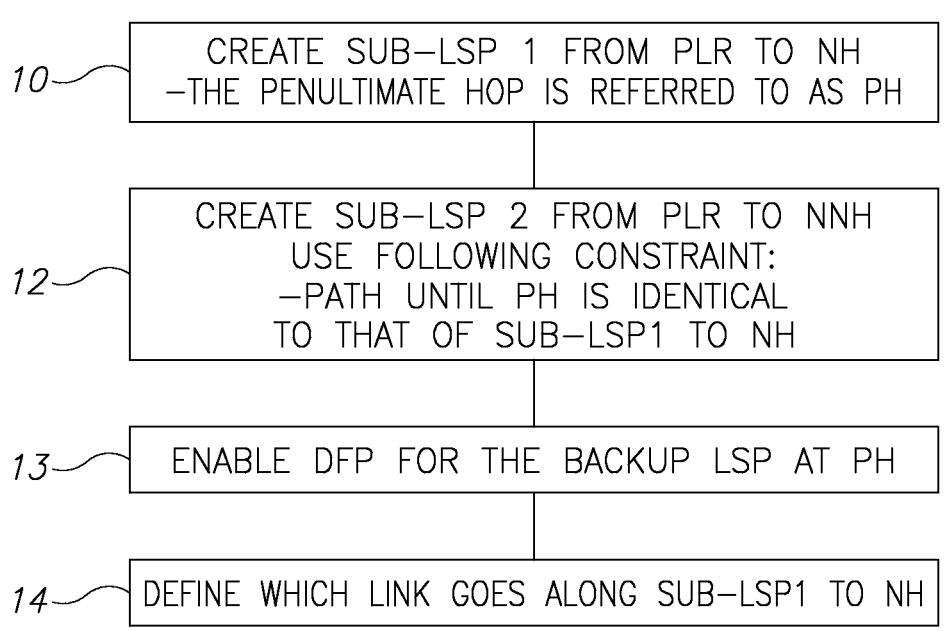
FIG.7

METHOD FOR FAST-RE-ROUTING (FRR) IN COMMUNICATION NETWORKS

FIELD OF THE INVENTION

The present invention relates to the field of data networking, more particularly to protecting logical paths in packet-switched communication networks, such as providing protection concurrently against either link or node failures along MPLS label switched paths.

BACKGROUND OF THE INVENTION

MPLS Technology

MPLS is a relatively new technology for fast delivery of packet-based traffic along pre-established logical paths called label switched paths (LSPs, a.k.a. tunnels), that can be provisioned over virtually any packet transport technology. MPLS supports traffic engineering (TE) to optimize usage of network resources, and is designed to offer a reliable traffic delivery, with predictable quality of service (QoS) and capacity (a.k.a., bandwidth) guarantees. MPLS uses a notion called label to identify, classify and forward data over LSPs.

A point-to-point (P2P) LSP delivers traffic from a source (a.k.a., ingress) node (a.k.a., label switching router, LSR) downstream to a destination (a.k.a., egress) LSR. The LSP may traverse intermediate (a.k.a., transit) LSRs.

FIG. 1 illustrates a P2P LSP that originates at ingress LSR1, traverses through transit LSR2 (from port "A" to port "B") and transit LSR3, and then terminates at egress LSR4. The LSP path may be summarized as 1-2-3-4.

A point-to-multipoint (P2MP) LSP delivers traffic from ingress LSR (a.k.a., root) downstream to one or more egress LSRs (a.k.a., leaf leaves). It is a tree-and-branch structure, where traffic is replicated at transit branch points and sent to the leaves. This scheme is efficient in terms of link capacity utilization, because only one copy of the traffic is ever sent per branching link.

FIG. 2 illustrates a P2MP LSP. Traffic is sent from ingress LSR1 to LSR2, where it is replicated towards leaf LSR3 and leaf LSR4. As illustrated by dashed gray lines, there are 2 sub-LSPs, with paths 1-2-3 and 1-2-4.

Note that LSR1 sends only one packet copy to LSR2, even though the link to LSR2 carries multiple sub-LSPs.

Fast Reroute (FRR)

A major MPLS feature is the support of fast reroute (FRR). FRR is a mechanism for rapid traffic restoration upon a link or node failure occurring along an LSP path. With FRR, an interrupted traffic stream can be rerouted around a failed node/link within a time period of under 50 milliseconds, thereby minimizing impact on the traffic.

The LSR located upstream of the failure (a.k.a., point of local repair, PLR), redirects the traffic of the so-called Working LSP onto a pre-established (P2P) backup LSP (a.k.a., bypass LSP), which bypasses the failure. The backup LSP is used to convey the traffic from the PLR to an LSR located downstream the failure (a.k.a., merge point, MP), after which the traffic returns to the Working LSP. The MP is also the egress LSR of the backup LSP.

For the sake of simplicity, it will be assumed hereinafter that the MP is the closest LSR downstream the failure. Accordingly, with FRR link protection, the MP is the next-hop (NH) LSR, i.e., the LSR at the far end of the protected link; with FRR node protection the MP is the next-next-hop (NNH) LSR, i.e. the LSR that follows the NH along the Working LSP path. The backup LSP may be shared, i.e. provide protection to multiple Working LSPs, in which case it is known as Facility backup LSP.

It will also be assumed that the failure of the protected link triggers switchover to backup LSP. This procedure provides fast detection time, because it is based on rapid physical layer indications. Examples for such indications are loss of signal, signal quality degradation, and alarm indication.

FIG. 3 illustrates FRR for a P2P Working LSP path whose path includes 1-2-3. Backup LSP B1 protects against the failure of the link from LSR2 to LSR3. It originates at PLR LSR2 and terminates at MP NH LSR3. Backup LSP B2 protects against the failure of LSR2, as well as the failure of the link 1-2. It originates at PLR LSR1 and terminates at NNH LSR3. The backup LSP path includes also transit LSR4.

(i) Link Protection Scenario: when the link 2-3 goes down, the PLR LSR2 redirects the traffic to B1 that forwards it to MP LSR3, after which the traffic returns to the Working LSP.

(ii) Node Protection Scenario: when LSR2 or the link 1-2 goes down, both detected by PLR LSR1 via the failure of the link to LSR2, the PLR redirects the traffic to B2, which in turn forwards it to MP LSR3, after which the traffic returns to the Working LSP.

Multi-Failure Problem

The problem with the FRR scheme described above is that it does not protect against concurrent failures along both the Working and the backup LSP. As may be seen in FIG. 3, when both link 1-2 along the Working LSP path and link 1-4 and/or 4-3 along the backup LSP path fail, all traffic goes down.

A real-life application for multi-failure protection is illustrated at FIG. 4. A network is comprised of two topological rings 1 and 2. Ring 1 is formed by LSRs 1-2-3-7-6, while ring 2 is formed by LSRs 3-4-5-8-7. The rings are interconnected via LSR3 and LSR7. The links are usually realized with optic fibers. A Working LSP 1-2-3-4-5 is protected against the failure of LSR3 and 2-3 via backup LSP 2-1-6-7-8-5-4.

(i) Node Protection Scenario: side A marks the failure of node 3. When link 2-3 fails, LSR2 (PLR) implies that LSR3 (NH) is down and redirects the traffic to the backup LSP along which it is conveyed to MP LSR4 (NNH). The successfully recovered traffic continues over the Working LSP towards LSR5.

(ii) Dual Link Failure Scenario: side B marks two link failures ("fiber cuts"), link 2-3 and link 8-5. When link 2-3 fails, LSR2 (PLR) redirects the traffic to the backup LSP, intended to bring it to MP LSR4 (NNH), after which the traffic would continue over the Working LSP towards LSR5. However, since link 8-5 failed too, the traffic reaches a dead end at LSR8 and cannot be recovered.

While concurrent node (LSR3) failure and fiber cut (link 8-5) are usually rare, a double fiber cut (e.g. 2-3 at Working path and 8-5 at backup LSP path) is common in some networks, at which case their service providers may require a solution to this problem. There are a number of solutions in the prior art, which try to resolve similar problems. Namely:

draft-ietf-mpls-p2mp-te-bypass-02.txt proposes P2MP bypass LSPs for protecting P2MP Working LSPs which requires the PLR to be capable of detecting the exact failed elements (e.g., whether a link or rather a node failed), after which it can activate the appropriate protection.

"The PLR needs to localize the failed elements in order to activate the P2MP Bypass Tunnel(s) protecting this element. Mechanisms through which this location is retrieved are out of the scope of this document."

"The PLR may be directly upstream to the protected link or node or may also be two or more hops upstream. In case the PLR is not directly upstream to the failure, rerouting within the Bypass Tunnel(s) may be triggered by the following events: Failure of a BFD session between the PLR and the protected Element; A Path that indicates the location of the failed Element."

The main drawback of this method is that it requires the PLR to distinguish between node and link failures. This often requires exchange of signaling, which complicates the solution and slows down the recovery time.

draft-vasseur-mpls-linknode-failure-00.txt (also described in US 2003233595) uses a specific method for distinguishing between a link failure and a node failure. It uses "Hello" message exchange over an alternative path between the PLR and NH for detecting when can the NH not be reached:

[section 5] " . . . the PLR uses the RSVP hello to determine whether its neighbor is reachable via another path than the failed link. If this is the case, the PLR can conclude of a link failure. If not, the failure is a node failure."

[section 7] "Once the link failure has been detected by the PLR . . . there is a period of time during which the PLR does not know whether the failure is a link or a node failure . . . "

Like the previous method, the main drawback of this method is that it requires the PLR to distinguish between node and link failures, which as explained above often requires signaling exchange, which in turn complicates the solution and slows down the recovery time.

US 2011/0110224 discloses a dual FRR method, which provides both link and node protection, where the NH applies blocking rules to avoid traffic duplication:

"to use backup LSP(s) to provide both link and node protection concurrently (thus initiating so-called Dual or concurrent FRR), while configuring a suitable blocking rule at the link protection merge point (the NH), to avoid traffic duplication that would otherwise occur with standard FRR."

The main drawback of the disclosed method is the need to replicate traffic at the NNH (called NNHOP) which consumes extra (twice) resources at the NNHOP, where internal capacity resources are often limited. This is especially undesired when protecting a P2P Working path, where there is no reason to carry out packets' replications.

"Traffic arriving on B3 to NNHOP LSR3 returns to the working LSP towards LSR4. Since NNHOP LSR3 is a transit & leaf LSR for B3, traffic also continues on B3 towards LSR2"

SUMMARY OF THE INVENTION

The object of the present invention is to provide a new fast reroute protection method which would provide both link and node protection without traffic duplication, without the need to distinguish between link and node failures, and without replicating traffic, and is suitable to address concurrent failures at the Working and the backup logical paths, and in particular LSP logical paths. This method is therefore referred to as "Dual Failure Protection" (DFP), though it could be expanded to multi-failure scenarios.

According to the present invention, a point-to-multipoint (P2MP) backup path (LSP) is used to provide both link and node protection for a link-node pair of a Working path, and to configure a suitable non-standard forwarding rule at the branching node of the backup LSP, to control whether traffic over the backup LSP would be forwarded to NH or to NNH. The backup LSP originates at the PLR, with NH and NNH as the leaf LSRs, where traffic paths of sub-LSPs to NH and NNH are identical until they branch off at the penultimate hop (PH) of sub-LSP to NH; the sub-paths being identical avoids the need to replicate traffic anywhere along the backup LSP path.

The PLR is not required to distinguish between link and node failures, and would switch traffic to the backup LSP based on a local link failure. The branching node is the penultimate hop (PH) of the sub-tunnel (of the backup LSP) to NH. The forwarding rule at the PH is as follows: PH forwards traffic to the NH when NH is Up, and to the NNH otherwise. Detection of NH being down is based on receiving an indication of a failure of the link PH-NH.

The forwarding rule at the PH is a non-standard one for MPLS systems, because it orders to send the traffic to either NH or NNH but not both, while a standard P2MP LSP branching node should replicate the traffic to each branch.

The proposed DFP method would fit any general (mesh) topology, but is especially applicable for ring topologies.

Other objects of the invention will become apparent as the description of the invention proceeds.

According to a first aspect of the invention, there is provided a method implementing the above-mentioned concept, namely: a method for fast rerouting (FRR) of traffic in a communication network, from a Working path comprising a first node called a point of local repair PLR, a link connecting the first node with a second, downstream node called a next hop node NH, and a third node positioned downstream to said second node along said Working path and called next-next hop node NNH; the method comprises:

pre-provisioning a point-to-multipoint (P2MP) backup path in the network having a start point at the PLR and two termination points being the NH and NNH;

pre-provisioning, in said P2MP backup path, a node PH being a penultimate hop to the NH, so that the PH is directly connected to the NH (via a single link);

wherein: the P2MP backup path comprises two sub-paths, one between the PLR and the NH, and the second between the PLR and the NNH, so that the two sub-paths are identical until they branch off at the penultimate hop (PH);

concurrently providing link protection against failure of said link between the PLR and NH, and node protection against failure of said second node NH, thereby ensuring concurrent FRR for the link and the second node by providing the PH node with a forwarding rule enabling to forward traffic, if received at the PH along said P2MP backup path, towards the second node NH in case the NH is UP, and downstream the P2MP backup path towards NNH in case the NH is not operative (DOWN).

In other words, by implementing the above described method, traffic duplication at the PH node is avoided, namely forwarding the traffic both to the second node NH and to the third node NNH in case the traffic is rerouted by the first node PLR is prevented, and in addition there is no requirement to distinguish a link failure from a node failure, and not to replicate traffic anywhere along either the Working path or the backup path.

As has already been mentioned, the method is advantageous for MPLS networks, where the FRR is performed from the Working path being an LSP comprising the first node (being point of local repair PLR), the link connecting the first node and the second, downstream node (NH), and at least one the third node (NNH) positioned downstream to the second node (NH); the backup path is also a backup LSP. The Working path and the backup path are a point-to-point (P2P) LSP and a point-to-multipoint (P2MP) LSP, respectively.

The method is suitable for performing FRR on mesh-like as well as (and especially) on ring-like network topologies.

The proposed method is especially advantageous and suitable for performing double failure protection DFP, wherein one failure occurs at the Working path while the other failure occurs at the backup path, for example in sections downstream of the PH node towards the NH or the NNH. The DFP capability is achieved by the special rule at the PH, which sends the traffic to the NH if it is operative (i.e. UP), and to the NNH if the NH is not operative (DOWN), thus one or multiple failures along the backup path downstream from PH to NNH would have no effect upon the traffic.

For a configuration where the network comprises two rings interconnected by a dual homed structure (DH node), the method further comprises:

arranging the Working LSP and the backup LSP so as to pass via both of the two rings, and for the backup path to include the DH, selecting the DH node to be the PH node.

According to a second aspect of the invention, there is provided a management system adapted to operate in a communication network (e.g. an EMS/NMS), adapted to pre-provision a backup P2MP path for a Working path to provide concurrent link and node fast reroute protection for the Working path, and being also adapted to generate messages (instructions) for nodes belonging to the network to implement thereat the method as described above.

According to a third aspect of the invention, there is provided a controlled network node (i.e., a network node comprising a control unit CU) adapted to operate in a communication network, the network element being provided with hardware and/or software means enabling the operation of that network node as the PLR node or as the PH node depending on a specific configuration of the Working path and the backup P2MP path, and according to the method described hereinabove.

In other words, any network node of the network discussed above (more specifically, the node's CU or the node's hardware/software means), is preferably provided with both capabilities of the PLR node, and the capabilities of the PH node.

Management of network nodes may be performed either centrally from a management system, or by signaling messages propagating along the Working path from an ingress node of the Working path. The ingress node still should be configured by a management system that determines which protection type (e.g., DFP enabled or not) should be assigned for the Working path.

For the PH node, the hardware/software means may be designed for receiving management and/or signaling instructions which relate to the backup P2MP path targeted for DFP protection, analyzing failure indications if any, storing and implementing the above suitable forwarding rules, thereby enabling the network node to function as the PH node.

According to yet another aspect, there is provided a software product encoding a computer program stored on a non-transitory computer readable storage medium for executing a set of instructions by a apparatus comprising one or more computer processors, for carrying out the method described hereinabove (wherein the apparatus should be understood to encompass one or more network management devices cooperating with controlled network nodes).

The software product may be stored as part of a management system (say, EMS/NMS), but may be distributed between the EMS/NMS apparatus and the CUs of the controlled network nodes. In other words, the software product may be stored partially at a management system, and partially in a plurality of controlled network nodes comprised in the network which is being managed by that management system.

Furthermore, there is provided a communication network capable of operating according to the above described method, carrying out FRR and DFP as described hereinabove.

BRIEF DESCRIPTION OF THE DRAWINGS

For a more complete understanding of the present invention, reference is now made to the following detailed description taken in conjunction with the accompanying drawings wherein:

FIGS. 6A and 6B illustrate a schematic solution as provided by the present invention to ensure Dual Failure Protection (DFP) in case of the example illustrated in FIGS. 4A and 4B;

FIG. 7 presents a flow chart of an embodiment of the present invention for creating a P2MP backup LSP.

DETAILED DESCRIPTION OF PREFERRED EMBODIMENTS

In the disclosure, the term "comprising" is intended to have an open-ended meaning so that when a first element is stated as comprising a second element, the first element may also include one or more other elements that are not necessarily identified or described herein, or recited in the claims. For the purposes of explanation, numerous specific details are set forth in order to provide a thorough understanding of the present invention. It should be apparent, however, that the present invention may be practiced without these specific details.

Figure 5:
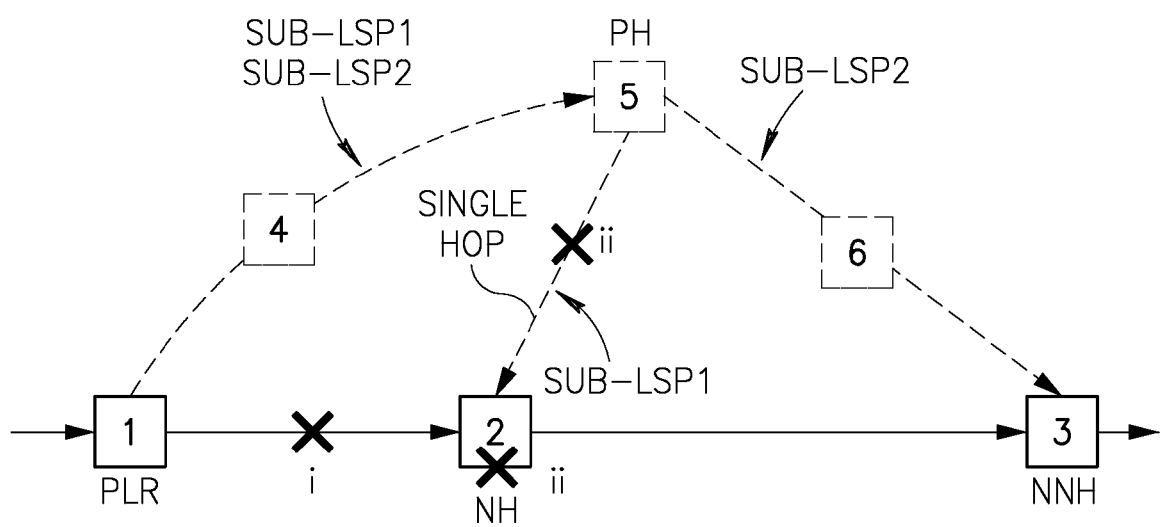
FIG. 5 illustrates schematically an embodiment of implementing the method of the present invention.

FIG. 5 illustrates a portion of a mesh network. The figure presents the basic dual failure protection scheme for a P2P Working LSP path whose path includes 1-2-3. The Working LSP is protected at PLR LSR1 by P2MP backup LSP which is composed of two sub-LSPs: a sub-LSPs to LSR2 (NH) with path 1-4-5-2, and a sub-LSP to LSR3 (NNH) with path 1-4-5-6-3. The PH is LSR5, being the penultimate hop of the sub-tunnel to LSR2 (NH). The LSRs 4, 5, 6 are optional. In the absence of LSR4 and LSR5, the PLR (LSR1) serves also as PH.

(i) Link Protection Scenario: when the link 1-2 goes down, the PLR LSR1 redirects the traffic to the backup LSP. When traffic arrives to PH, it directs it to NH, since the link 2-5 is Up (which implies that NH is Up). NH returns the traffic to the Working LSP, by sending it to NNH.

In the absence of LSR4, the traffic goes directly from PLR to PH. In the absence of both LSR4 and LSR5, the PLR LSR1 functions also as PH, and the links 1-4-5-2 are merged into a single link 1-2, in parallel with the other link 1-2.

(ii) Node Protection Scenario: when the link 1-2 goes down, the PLR LSR1 redirects the traffic to the backup LSP. When traffic arrives at the PH, it directs it to LSR6, since the link 2-5 is DOWN (which implies that NH may also be DOWN). LSR6 forwards the traffic to NNH, where it returns to the Working LSP. In the absence of LSR6, traffic would be forwarded directly from PH to NNH.

Figure 1:
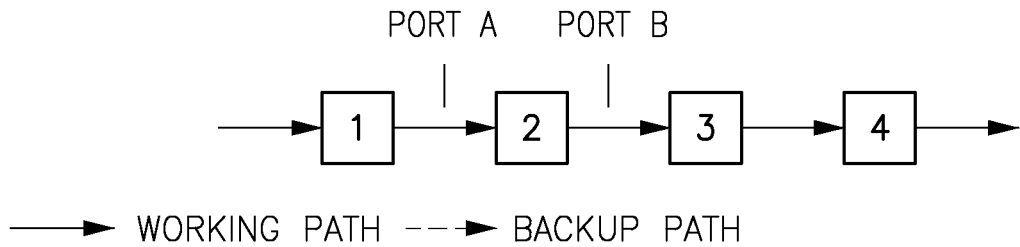
FIG. 1 illustrates a schematic prior art point-to point (P2P) Working path, which is an LSP in a case of an MPLS network.
Figure 2:
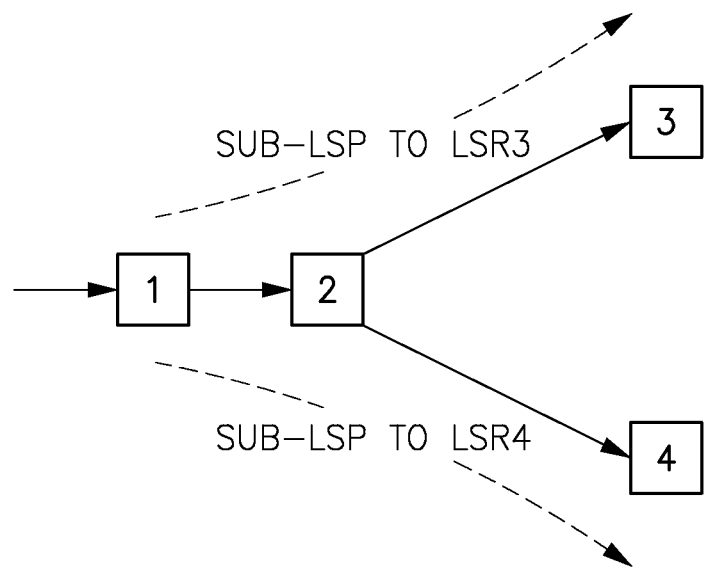
FIG. 2 illustrates a schematic prior art point-to multipoint (P2MP) Working path (LSP)
Figure 3:
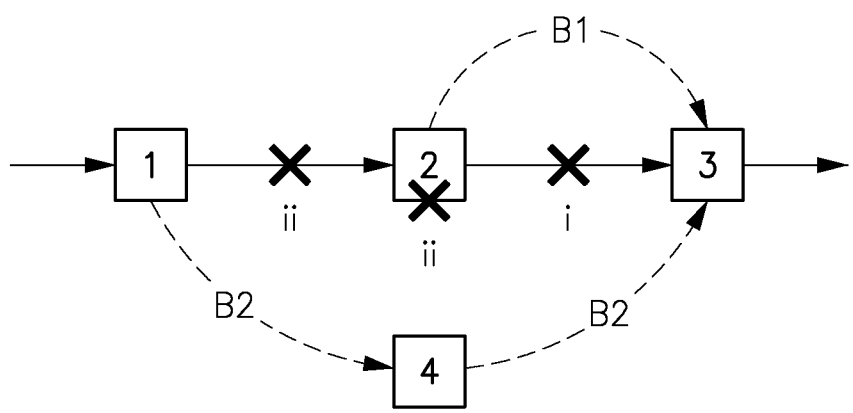
FIG. 3 illustrates a schematic prior art principle of fast reroute (FRR) for a P2P Working path (LSP)
Figure 4A:
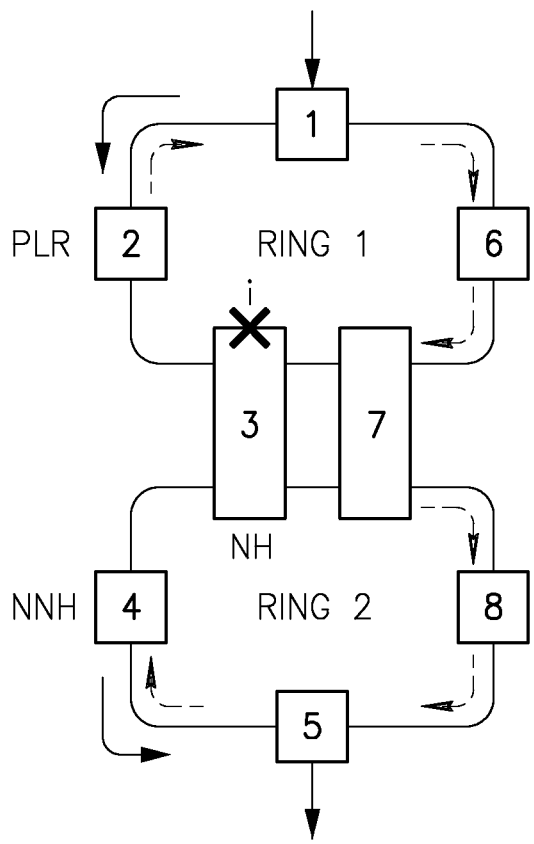
FIGS. 4A and 4B illustrate schematically a problem resulting from a multiple failures, using an example of two interconnected ring networks.
Figure 4B:
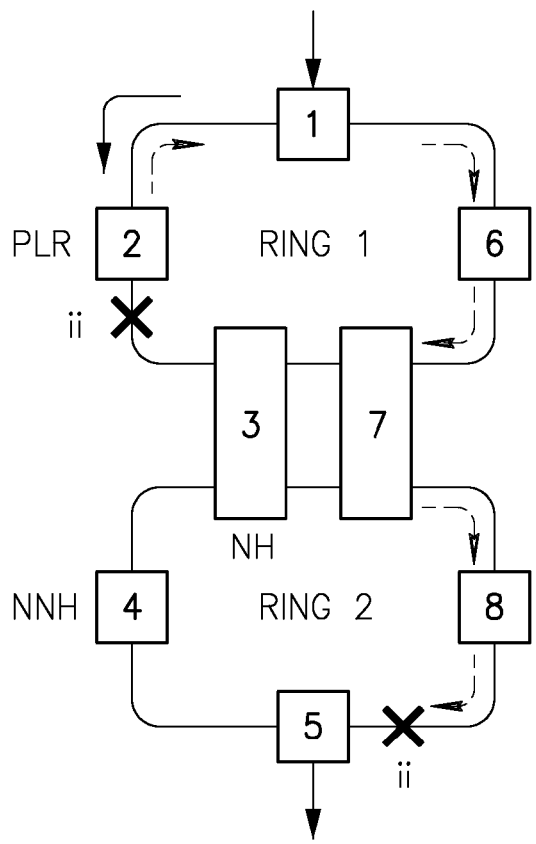

FIG. 6, the dual failure protection scheme is illustrated as being implemented at a ring-like network, more specifically at the network illustrated in FIG. 4. The Working LSP 1-2-3-4-5 is protected at PLR LSR3 by P2MP backup LSP which is composed of two sub-LSPs: a sub-LSPs to LSR3 (NH) with path 2-1-6-7-3, and a sub-LSP to LSR4 (NNH) with path 2-1-6-7-8-5-4. The PH is LSR7, being the penultimate hop of the sub-tunnel to LSR3 (NH).

(i) Node Protection Scenario: when the link 2-3 goes down, the PLR LSR2 redirects the traffic to the backup LSP. When traffic arrives to PH LSR7, it directs it to LSR8, since the link 7-3 is DOWN (which implies that NH LSR3 may also be DOWN). LSR8 forwards the traffic via LSR5 to NNH, where it returns to the Working LSP, thereby completing successful recovery.

(ii) Dual Link Failure Scenario: when the link 2-3 and either or both of links 8-5 and 7-8 are DOWN, the PLR LSR2 redirects the traffic to the backup LSP. When traffic arrives to PH, the PH directs it to NH, since the link 7-3 is UP (which implies that NH LSR3 is also UP). NH returns the traffic to the Working LSP, sending it to NNH. This completes the recovery of the traffic upon dual link failures, one link per topological ring.

Generally speaking, the P2MP backup LSP for dual failure protection can be established like an ordinary P2MP backup LSP, with the following exception: the proposed non-standard forwarding rule should be configured at the PH LSR. Thus, instead of normally replicating the traffic towards both NH and NNH, the PH would send the traffic towards NH only, when NH is UP, and towards NNH only, when NH is DOWN. Since PH is directly connected to NH, the determination of the NH state (either UP or DOWN) can be based upon rapid physical layer indications. The rule at the PH can be configured statically using a management system. Alternatively, the rule can be configured dynamically via signaling, e.g. by applying the following steps: 1) Ingress LSR requests DFP protection for the Working path, 2) PLR sends signaling request to establish the sub-LSPs to the NH and the NNH, where it raises DFP flag and specifies the PH identification, 3) PH is reconfigured to act accordingly, should traffic arrive over the P2MP backup path.

The P2MP backup LSP for DFP is capable of being shared, providing protection to multiple Working LSPs, i.e. serving as a Facility backup P2MP LSP.

The DFP method can be expanded to a multi-ring connectivity, by handling each two interconnected rings as explained for FIG. 6: the ring that sends the traffic would be considered as ring 1, while the ring that receives the traffic would be considered as ring 2. Thus, a Working LSP spanning n rings could be protected by n P2MP backup LSPs (one P2MP backup LSP per ring), originated at n PLRs, and having n PH nodes, respectively.

FIG. 7 presents a block diagram for establishing a P2MP backup LSP for dual failure protection as exemplified in FIG. 5. In this example, the backup path is selected/pre-provisioned by a management system, such as EMS/NMS and the flow chart presented can be understood as a block diagram of suitable software products operative at the EMS/NMS. The relevant network nodes may be informed by the EMS/NMS about the selected backup path. Alternatively, signaling information generated by the management (EMS/NMS) may be provided only to the ingress LSR of the Working path, which in turn will generate signaling messages to be received along the Working path, so as to request the required DFP (dual failure protection), wherein the PLRs would generate signaling messages of their own to establish the required P2MP DFP backup paths. The flow chart comprises step/block 10 of creating a sub-LSP 1 from PLR to node 2 (NH), and then comprises block 12 of creating sub-LSP 2 from PLR to node 3 (NNH), where the paths of these sub-LSPs are identical up to the penultimate hop (PH, node 5) of sub-LSP 1, thereby avoiding traffic replication.

Block 13 of the algorithm ensures that Dual Failure Protection is enabled for the backup LSP at the PH.

Block 14 comprises specifying the link that connects the PH with the NH.

While the P2MP backup path is pre-provisioned by the Management System EMS/NMS), control units of the network nodes are supposed to be provided with suitable hardware and software means which would allow their functioning as a PLR node, a PH node, etc.

Figure 8:
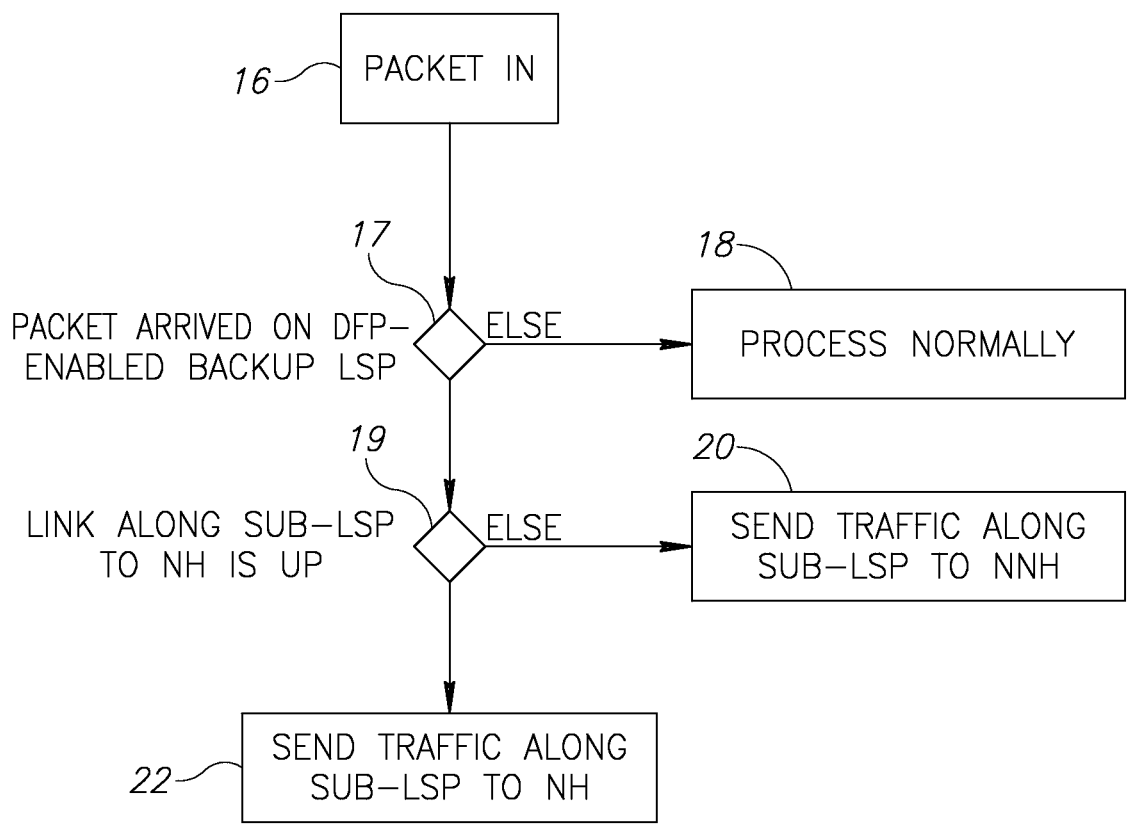
FIG. 8 presents a flow chart of another embodiment of the present invention carried at the PH (penultimate hop) node, performed by the control unit and the hardware of an LSR serving as the PH.

FIG. 8 shows a block diagram for making decisions at the PH (the branching point of the P2MP backup path, in our example—node 5 of FIG. 5). The control unit CU and hardware intrinsically existing in any node and, naturally, in the PH, is provided with the novel proposed software and ensures forwarding of data packets arriving to the PH, according to the presented block diagram.

Block 16 presents receiving an incoming data packet at the PH;

Block 17 checks whether the data packet has arrived along the pre-provisioned backup LSP being DFP-enabled. If not, the packet will be processed normally (block 18).

If the packet is indeed a redirected packet arriving along the pre-provisioned backup LSP, the logical block 19 will check whether the NH node is UP. If, according to indications received at the PH, the link along the sub-LSP connecting the PH with the NH is UP, it will mean that NH is UP, and the packet will be sent along the sub-LSP to NH (block 22). Else, if the link to NH is DOWN, it will mean that NH is DOWN, and the packet will be sent along the sub-LSP to NNH (block 20).

The flow charts presented in FIGS. 7 and 8 can be implemented to other examples of fault scenarios and/or to other network configurations, for instance that which is illustrated in FIG. 6.

In short, the proposed DFP technique described hereinabove has the following advantages in comparison with the prior art references:

Draft-ietf-mpls-p2mp-te-bypass-02.txt requires that PLR would detect whether a link or rather a node failed, after which it can activate the appropriate protection. With the DFP, the PLR need not distinguish between link and node failures, and would behave the same for both failures. This enables fast detection time, based on rapid physical layer indications, and avoids both signaling overhead to identify a node failure and slowing down of the recovery due to the signaling.

Draft-vasseur-mpls-linknode-failure-00.txt uses a method for distinguishing between link and node failure, and as such possesses the same drawbacks discussed above.

US 2011/0110224 applies a blocking rule at the NH. It requires traffic replication at the NNH, one copy towards NH and another over the Working path. Unnecessary packet replication (multicasting) is undesired, especially for P2P traffic. It consumes extra resources at switches, which are often not optimized for multicasting, let alone multicasting while preserving MPLS-grade QoS. With the DFP, the NH behaves normally, as the special rule is applied at the PH, and it does not require packet replication anywhere along the traffic path.

While the present invention has been described with reference to specific versions of the method and embodiments of a management system and a controlled network node, Although the invention has been described primarily for providing protection concurrently against either link or node failures along MPLS label switched paths, still, the problem addressed by this invention is relevant for various types of networks and data protocols, as has been described for multiprotocol label switching (MPLS) networks, for the sake of easing on the reader. Thus, it should be appreciated that other versions of the method and other modifications of the management system and the node may be suggested which are to be considered part of the invention whenever defined by the claims which follow.

The invention claimed is:

1. A method for fast rerouting (FRR) of traffic in a communication network, from a Working path comprising a first node being a point of local repair (PLR), a link connecting the first node with a second, downstream node being a next hop node (NH), and a third node positioned downstream to said second node along said Working path being a next-next hop node (NNH); the method comprises:
   pre-provisioning a point-to-multipoint (P2MP) backup path having a start point at the PLR and two termination points being the NH and the NNH,
   pre-provisioning, in said P2MP backup path, a node PH being a penultimate hop to the NH, so that the PH is directly connected to the NH;
   wherein the P2MP backup path comprising two sub-paths, a first extending between the PLR and the NH, and a second between the PLR and the NNH, and wherein the two sub-paths are identical until they branch off at the penultimate hop (PH);
   concurrently providing link protection against failure of said link between the PLR and NH, and node protection against failure of said NH, thereby ensuring concurrent FRR for said link and said NH by implementing at said PH node a forwarding rule enabling to forward traffic, if received at the PH along said P2MP backup path, towards said NH in case the NH is UP, and downstream the P2MP backup path towards said NNH in case said the NH is DOWN.

2. The method according to claim 1, for use in an MPLS network and wherein traffic is rerouted from the Working path being a label switched path (LSP) which comprises the first node being point of local repair (PLR), the link connecting the first node and the second, downstream node (NH), and at least one said third node (NNH) positioned downstream to said second node (NH); and the backup path being a backup LSP.

3. The method according to claim 1, wherein said Working path and said backup path are a point-to-point (P2P) LSP and a point-to-multipoint (P2MP) LSP respectively.

4. The method according to claim 1, adapted to perform an FRR process in a ring-like communication network.

5. The method according to claim 1, adapted to perform double failure protection (DFP).

6. The method according to claim 5, wherein the network comprises two rings interconnected by a dual homed node (DH), and wherein the method further comprising:
   arranging the Working LSP and said backup LSP so as to pass via both of said two rings, and for the backup path to include the DH; and
   selecting the DH node to be the PH node.

7. The method according to claim 3, wherein a Working LSP spanning ring networks is protected by n P2MP backup LSPs, one P2MP backup LSP per ring network.

8. A software product encoding a computer program stored on a non-transitory computer readable storage medium for executing a set of instructions by an apparatus comprising one or more computer processors, for carrying out the method of claim 1.

9. A method for non-Label Distribution Protocol (non-LDP) fast rerouting (FRR) of traffic in a communication network, from a Working path comprising a first node being a point of local repair (PLR), a link connecting the first node with a second, downstream node being a next hop node (NH), and a third node positioned downstream to said second node along said Working path being a next-next hop node (NNH); the method comprises:
   pre-provisioning a point-to-multipoint (P2MP) backup path having a start point at the PLR and two termination points being the NH and the NNH,
   pre-provisioning, in said P2MP backup path, a node PH being a penultimate hop to the NH, so that the PH is directly connected to the NH;
   wherein the P2MP backup path comprising two sub-paths, a first extending between the PLR and the NH, and a second between the PLR and the NNH, and wherein the two sub-paths are identical until they branch off at the penultimate hop (PH);
   concurrently providing link protection against failure of said link between the PLR and NH, and node protection against failure of said NH, thereby ensuring concurrent FRR for said link and said NH by implementing at said PH node a forwarding rule enabling to forward traffic, if received at the PH along said P2MP backup path, towards said NH in case the NH is UP, and downstream the P2MP backup path towards said NNH in case said the NH is DOWN.

* * * * *